July 6, 1937.　　　　M. V. WARD　　　　2,086,453
WINDSCREEN WIPER
Filed March 4, 1936
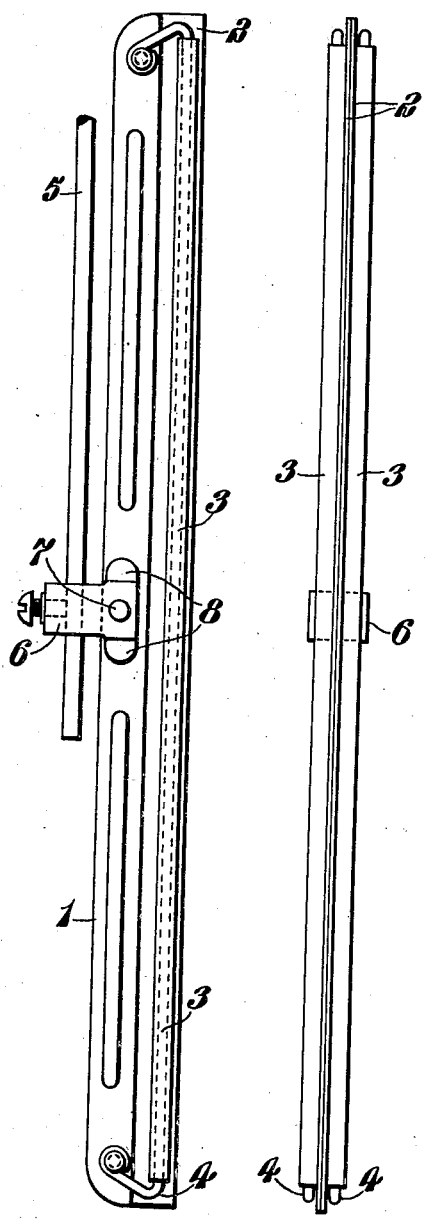
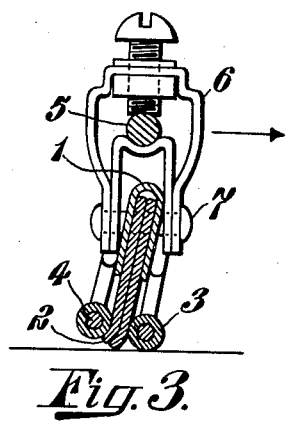
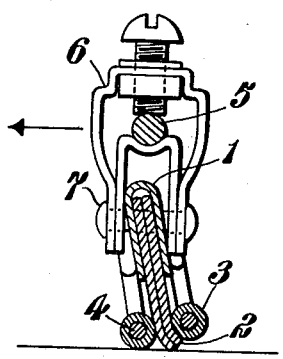
Fig. 1.　Fig. 2.　Fig. 3.　Fig. 4.
Inventor
Montague Vernon Ward
By O. B. Singer, atty.

Patented July 6, 1937

2,086,453

UNITED STATES PATENT OFFICE 2,086,453

WINDSCREEN WIPER

Montague Vernon Ward, London, England

Application March 4, 1936, Serial No. 67,151
In Great Britain April 1, 1935

3 Claims. (Cl. 15—250)

This invention relates to windscreen wipers and more particularly to the squeegee-like blades employed in these devices, and has for its object to provide blades efficient in action, lasting in use, and which moreover will be cheap to manufacture.

In general, blades for windscreen wipers according to the invention comprise a metal strip support to receive a rubber or other similar strip or a plurality of such strips forming a main portion of the squeegee and on both sides in a position intermediate the edge of the support and the front edge of the rubber strip, a supplementary and separate member of rubber or the like is provided abutting the side of the strip and comprised by a cord or tube of any desirable cross section, and is maintained in position by any suitable means. For example, it may be carried by a wire or other frame suitably secured to the metal support.

It will be appreciated that the squeegee blade thus constructed consists of a main central strip or strips with a free outer edge, having two lateral projections more or less co-extensive with its length.

The lateral projections tend to support or strengthen the squeegee proper and in addition may, if desired, be so positioned that in the normal rocking action of the blade on its connection, the one or other of the projections is brought into contact with the surface being wiped, according to the direction of movement.

A preferred embodiment of the invention is illustrated by way of example in the accompanying drawing, wherein:—

Fig. 1 is a side view of the wiper.

Fig. 2 is an edge view, and

Figs. 3 and 4 are sectional views showing the wiper in use in two positions.

In the embodiment shown on the drawing, the wiper comprises a metal support 1 of channel form which is adapted to grip a length of rubber strip adapted to form the squeegee portion proper, which strip of course projects beyond the edge of the support 1. As shown in the accompanying drawing, in place of employing a single rubber strip, a pair of strips 2 is utilized in order to give additional flexibility of the wiping edge. A supplementary member 3 is provided on each side of the squeegee strips 2, intermediate the edge of the support 1 and the front edge of the strips 2, the said supplementary member 3 being supported in contact with the strips 2 in any suitable manner, for example as shown by means of a metal wire support 4, extending through the member 3, which is, in the form shown of tubular form, and fixed to the support 1 by means of rivets, screws or otherwise, the ends of the said metal wire 4 being bent at an acute angle as shown in Fig. 1. The supplementary members 3 act to support or strengthen the strip or strips 2 forming the squeegee proper. As shown in Figs. 3 and 4, the supplementary members 3 may be adapted to come into contact with the surface to be wiped, thus obtaining an improved wiping action. To enable the members 3 to assist in wiping, the support 1 can be adapted to tilt back and forth during wiping.

In order to permit the desired freedom of movement of the wiper proper, same is supported from an operating rod 5, to which desired movements are imparted, by means of a connector device 6 shown in Figs. 1, 3 and 4, provided with a screw for clamping said connector device to the operating rod 5 and with a pivot pin 7 extending through apertures in the channel support 1. Lateral projections 8 are provided on the said connector device 6.

The invention is not limited to the precise forms or details of construction described, as these may be varied to suit particular cases.

What I claim and desire to secure by Letters Patent of the United States of America is:

1. A windscreen wiper blade comprising a metal support, a squeegee wiper strip held in said support and projected beyond the front edge of the same, supplemental members located one along each side of said strip intermediate the free edge of said strip and the edge of said support, said supplemental members each comprising a rod-like body and means for maintaining the body on said support and holding it in position to cooperate with said strip for purposes described.

2. A windscreen wiper blade comprising a metal support, a squeegee wiper strip held in said support and projected beyond the front edge of the same, supplemental members located one along each side of said strip intermediate the free edge of said strip and the edge of said support, said supplemental members each comprising a rod-like body and means for maintaining the body on said support and holding it in position to cooperate with said strip for purposes described, said rod-like bodies each comprising a wire core and a rubber sheath on said core.

3. A windscreen wiper blade comprising an elongated channeled support, a squeegee wiper strip held in the channel of said support and projecting outwardly therefrom, a pair of tubular members mounted on rods secured to said support and lying longitudinally alongside the projecting part of said wiper strip adjacent the free edge of the same.

MONTAGUE VERNON WARD.